United States Patent [19]

Rothwell et al.

[11] 4,345,961
[45] Aug. 24, 1982

[54] CORROSION RESISTANT VALVE CONSTRUCTION

[75] Inventors: Thomas F. Rothwell; Gerald B. Smith, both of Bradford, Pa.

[73] Assignee: Dresser Industries, Inc., Dallas, Tex.

[21] Appl. No.: 248,665

[22] Filed: Mar. 27, 1981

Related U.S. Application Data

[62] Division of Ser. No. 151,222, May 19, 1980, Pat. No. 4,303,094.

[51] Int. Cl.³ .......................... B32B 1/10; F16K 1/22
[52] U.S. Cl. ............................... 156/294; 29/157.1 R; 29/458; 29/527.1; 29/527.2; 156/295; 156/320; 264/134
[58] Field of Search .................. 156/294, 295, 320; 264/263, 134, 242; 251/305; 403/28, 30, 282; 29/157.1 R, 458, 527.1, 527.2

[56] References Cited

U.S. PATENT DOCUMENTS

| | | | |
|---|---|---|---|
| 3,024,300 | 3/1962 | Martin | 403/282 |
| 3,036,674 | 5/1962 | Branin | 403/282 |
| 3,958,595 | 5/1976 | Al et al. | 251/305 |
| 3,988,000 | 10/1976 | Reece | 251/305 |
| 4,064,619 | 12/1977 | Echols et al. | 29/458 |
| 4,102,030 | 7/1978 | King | 29/458 |
| 4,273,835 | 6/1981 | Higuchi | 156/294 |

*Primary Examiner*—Jerome W. Massie
*Attorney, Agent, or Firm*—Daniel Rubin

[57] ABSTRACT

A valve, such as a butterfly valve having an offset closure vane and stub shafts for operating the vane in the flow passage of the body, has all exposed and/or potentially vulnerable metal surfaces encapsulated in a corrosion-resistant polymeric plastic coating. Providing bearing support for the vane drive shaft are a pair of spaced apart journal bearings located in the shaft bore in a shrink fit relation to the coating thereat.

4 Claims, 4 Drawing Figures

CORROSION RESISTANT VALVE CONSTRUCTION

This is a division, of application Ser. No. 151,222, filed May 19, 1980 now U.S. Pat. No. 4,303,094.

TECHNICAL FIELD

The field of art to which the invention pertains comprises the art of valves, including liners and protectors therefor.

BACKGROUND OF THE INVENTION

The prior art to which the invention is directed includes the art of valves and particularly butterfly valves being a type in which a usually circular closure vane or disc is mounted either centralized or offset for rotation in the body flow passage between an open and closed position. Construction of such valves commonly consists of a body and/or closure vane of cast iron or the like operable by means of an operator shaft extending through a bore in the body wall to externally thereof. Where the valve is likely to be utilized in corrosive service, the more corrosion vulnerable components and sometimes the entire valve is frequently constructed from more exotic and more expensive materials such as stainless steel. As an alternative less costly construction, a recent trend in the industry has been to apply either a protective polymeric coating and/or a detachable liner about those components or surface portions susceptible to corrosive attack by the line content of the piping system in which the valve is to be used. Exemplifying such prior art type butterfly valves for corrosive service of both the centralized and offset variety are the disclosures of U.S. Pat. Nos. 3,958,595; 3,801,066; 3,563,510; 3,425,439; 3,376,014; 3,241,806; and 3,076,631.

Disclosed in U.S. Pat. No. 3,958,595 is a unique construction in which the entire valve, including the shaft bore, is coated for protection. Not only is the entire valve thereof afforded corrosion protection enabling use of the less costly metals that would otherwise be susceptible to corrosive attack, but the bore coating per se can for appropriate applications be rendered capable of carrying the bearing load of the rotatable vane shaft. While the bearing capability of a nylon bore coating has proven to be highly suitable for bearing loads of up to about 4000–5000 psi, it has been found that at encountered loads generally exceeding those limits the coating is insufficiently durable to afford the required bearing life normally expected of such valves. At the same time, servicing such valves from the standpoint of bearing maintenance can be most difficult. The need for enhanced bearing capacity under those circumstances has therefore been recognized, but unfortunately conventional approaches have tended to destroy continuity of the protective coating to in turn defeat the corrosive protection intended to be afforded thereby. Despite recognition of the problem, a ready solution of how to enhance bearing capacity without destroying the protective coating has not heretofore been known.

SUMMARY OF THE INVENTION

The invention relates to valves and more particularly to butterfly valves for corrosive resistant service. In accordance with the construction hereof, a continuous plastic coating of corrosive resistant composition is completely bonded to the valve body throughout in the manner generally disclosed in U.S. Pat. No. 3,958,595 but without need to size the shaft bore coating to the same degree. Sleeve type, metal and/or composition plastic journal bearings axially pressed into the bore coating when still hot and pliable result in a shrink fit relation therewith when the coating has cooled. By the bearings being selectively sized, their positioning in place enables a thin protective coating to remain between each sleeve bearing and the wall surface of the shaft bore. In this manner enhanced bearing life is afforded free of fretting, etc. as compared to what would otherwise be available and is achieved without destroying either continuity of the protective coating or the corrosion protection intended to be afforded thereby. At the same time, since it is not contemplated that the coating will be required to per se endure the bearing wear load, its integrity can be more readily maintained while the previous need for hot sizing the coating is eliminated. In the event maintenance is needed, the inserted bearing sleeves are rendered capable of being removed and/or replaced if and when required.

It is therefore an object of the invention to provide novel method and apparatus affording enhanced bearing longevity in a coated valve construction for corrosive line service.

It is another object of the invention to effect the preceding object in a trunnion operated valve completely encapsulated in a bonded polymeric coating for corrosive protection without adversely affecting continuity of the coating.

It is a still further object of the invention to effect the previous objects with a bearing construction of greater serviceability than previously available in otherwise similar constructions of the prior art.

Figure 1:
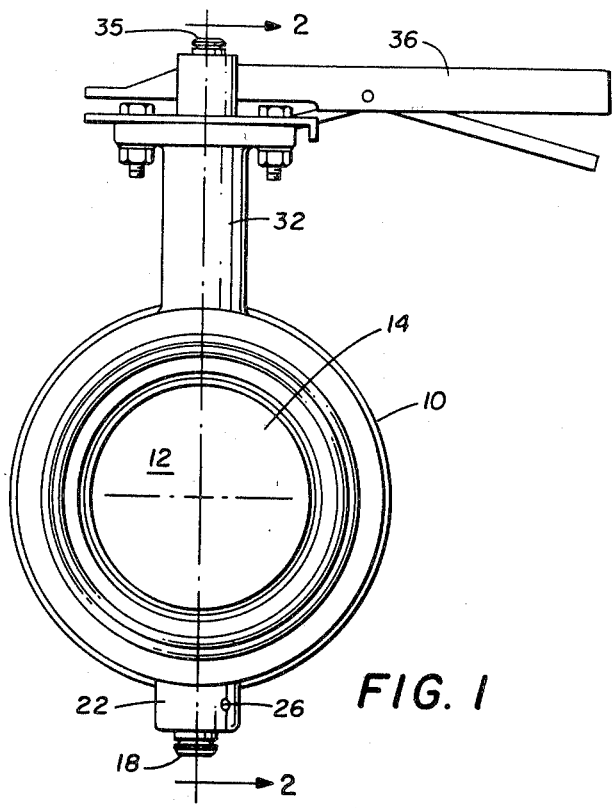
FIG. 1 is a front elevation of a wafer-type butterfly valve in accordance herewith.
Figure 2:
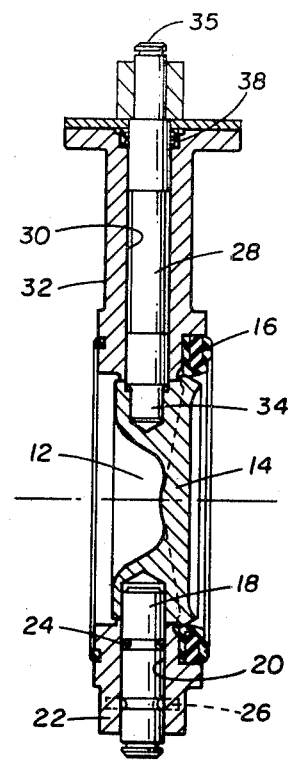
FIG. 2 is a sectional elevation taken substantially along the lines 2—2 of FIG. 1.

Referring now to the drawings, there is illustrated a wafer-type butterfly valve formed of a cast iron ringlike body 10 defining a central flow passage 12. Contained within passage 12 is an offset or double offset closure vane 14 mounted for rotation on trunnion stub shafts 18 and 28. For closing the passage to fluid flow, vane 14 cooperates with an annular resilient gasket seal 16 in a well known manner.

Supporting vane 14 at the underside of the valve is a stationary stub shaft 18 contained in body bore 20 extending outward through boss 22. A static gasket 24 seals against possible leakage therepast while a cross pin 26 transversely extending through shaft 18 secures the shaft in position against inadvertent rotation.

Supporting vane 14 on its topside is the operator drive shaft 28 extending from a rotational interlock with the vane through bore 30 of integral body neck 32 to outward thereof. Shaft 28 is preferably of stainless steel or other corrosion resistant metal, and at its underside 34 where rotationally interlocking with the vane is of hexagonal or other cross-section able to effect a driving connection therewith. At its top end 35, shaft 28 is shaped to accommodate a suitable operator 36 whereby the valve can be opened or closed as required either manually or by power drive. A dynamic seal 38 about shaft 28 precludes line content leakage therepast.

As disclosed in the aforementioned U.S. Pat. No. 3,958,595, the entire body and vane are provided with a moisture impervious, resilient, polymeric coating 40 bonded to the metal surfaces. Coating 40 is usually on the order of about 8 to 10 mils in thickness and can comprise either a thermoplastic or thermosetting composition characterized by good chemical and impact resistance. Suitable compositions may include nylon, polyethylene, polypropylene, polyurethane, polyvinylchloride (PVC) or the like, which for reasons hereof, as will be understood, must be subject to a liquid phase during the heat curing or bonding thereof to the metal substrate. Of the named compositions, nylon has been preferred and which can be applied by such known techniques as fluidized bed, electrostatic spray or combinations thereof.

For understanding the invention, it must first be appreciated that the coating 40 is usually applied to the body 10 when the latter is at a target temperature of on the order of 350° F. to 500° F., it being essential that at the target temperature the selected coating material be in a more or less soft, pliable, semi-liquid and generally unhardened state to accommodate sleeve shaped journal bearings 42 and 44 in accordance herewith. Typical target temperatures are about 400° F. for nylon, polyethylene and polyurethane and about 450° F. for polypropylene and polyvinylchloride. The sleeve bearings can be of either uncorrosive metal or plastic composition and a commercial form of the latter marketed under the trademark Armalon was found most suitable.

Figure 3:
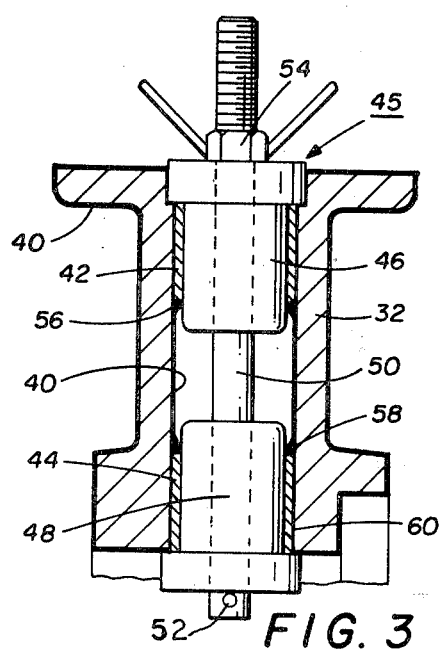
FIG. 3 is a fragmentary enlarged section illustrating fixture placement of the sleeve bearings in accordance with the invention.
Figure 4:
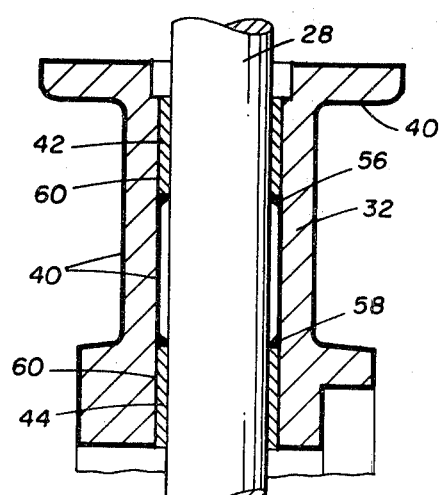
FIG. 4 is a fragmentary enlarged section of the vane shaft supported in its post-assembled relation.

Referring now more specifically to FIGS. 3 and 4, coating 40 applied in bore 30 is generally somewhat thicker than elsewhere, being on the order of about 15 mils, and forming an inside diameter less than the outside diameter of the bearings 42 and 44. At the same time the outside diameter of the bearings is about eight thousandths (0.008) inches less than the cross-sectional diameter of bare uncoated bore 30. With the bore coating hot and relatively soft at the aforementioned target temperature, bearing 42 is urged inward at the top end of bore 30 by means of a forming fixture 45 which includes an upper T-shaped mandrel 46 supporting the bearing thereon. Bearing 44 is then similarly forced inwardly of the bore at its bottom end by means of the forming fixture's T-shaped mandrel 48. With a shaft 50 extending through both mandrels, a cross pin 52 is inserted at its lower end and a nut 54 inserted at its upper end enabling tightening of the nut to secure the fixture in position. Tightening the nut further in that relation draws both mandrels toward each other until a predetermined axial relationship and alignment is achieved as determined by the mandrel collars engaging body shoulders in the manner illustrated in FIG. 3. When the coating has subsequently cooled sufficiently to achieve an adequate degree of hardening, forming fixture 45 is removed leaving only the bearing sleeves 42 and 44 in place in a shrink fit relation with respect to the coating thereat. Typically, cool down for a 6-inch valve takes about one hour which can, of course, be varied to suit.

It can be understood in view of the dimensional relationships between bare bore 30, the virgin thickness of coating 40 therein and the outside diameter of the bearing sleeves 42 and 44 that axial inward forcing of the sleeves will cause a bunching of the displaced coating at the inside face of the bearings as shown at 56 and 58. At the same time, the dimensional clearance between the O.D. of the sleeve bearing and the I.D. of the bare bore will leave a thin reduced thickness coating 60 therebetween so as to maintain coating integrity throughout. Since a shrink fit is afforded to the bearings from the subsequent cooling of the coating, pregreasing of the bearing O.D.'s may be required to enable subsequent removal in the event servicing or replacement should ever be required in the future. Annular bunchings 56 and 58 provide a permanent replacement seat therefor.

By the above description there is disclosed a novel valve and method of construction for a butterfly valve in which increased bearing longevity for the operating shaft is afforded in a high load corrosively coated valve body without disrupting the protective coating. Placement of the bearing is both relatively easy and inexpensive to effect as to enable increased bearing life in such valves to be obtained without significant cost increase and without destroying continuity of the coating. Whereas the invention has been described herein as particularly useful in offset or double offset valves of the butterfly type, it should be readily apparent that it can be utilized elsewhere in other valve types for which similar benefits are to be sought.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pipe line valve for corrosive service including a metal body defining a flow passage between an inlet and an outlet, a closure member in said passage, a rotatable operator shaft extending from a driving connection with said closure member to a location external of said body, means defining at least one bore through a wall of said body for accommodating said operator shaft, and a corrosion resistant coating bonded to said valve body on at least the wall surface of said shaft bore, the method of placing a sleeve bearing for said operator shaft in said bore comprising the steps of selecting a sleeve bearing of outside diameter less than the uncoated diameter of said bore but greater than the inside diameter of the bonded coating thereon, and while the coating is at an elevated temperature in a semi-fluid unhardened state gradually pressing the sleeve axially inward of the bore to inwardly displace a quantity of coating composition encountered against the inward face of the sleeve.

2. In a pipe line valve according to claim 1 in which the selection step of said sleeve bearing placement method includes selecting a plurality of sleeve bearings of like dimension and said pressing step includes pressing each of said sleeve bearings to predetermined axially displaced locations within said shaft bore.

3. In a pipe line valve according to claim 2 in which the pressing step of said sleeve bearing placement method includes pressing at least one sleeve bearing into one end of said shaft bore and pressing at least one sleeve bearing into the other end of said shaft bore.

4. In a pipe line valve according to claims 1, 2 or 3 in which the pressing step of said sleeve bearing placement method includes use of a forming fixture having a mandrel on which to support a sleeve bearing during placement and there is included the additional step of removing said forming fixture after the coating in the shaft bore has cooled to a hardened state.

* * * * *